(12) United States Patent
Tripp et al.

(10) Patent No.: US 10,997,054 B1
(45) Date of Patent: May 4, 2021

(54) LEVERAGING TRAINING DATA TOWARDS INCREASING THE EXPLAINABILITY OF ML-BASED CODE ANALYSIS TOOLS

(71) Applicant: Amazon Technologies, Inc., Seattle, WA (US)

(72) Inventors: Omer Tripp, San Jose, CA (US); Qiang Zhou, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/694,907

(22) Filed: Nov. 25, 2019

(51) Int. Cl.
*G06F 9/44* (2018.01)
*G06F 11/36* (2006.01)
*G06F 16/9035* (2019.01)
*G06F 16/907* (2019.01)
*G06N 20/00* (2019.01)

(52) U.S. Cl.
CPC ........ *G06F 11/3604* (2013.01); *G06F 16/907* (2019.01); *G06F 16/9035* (2019.01); *G06N 20/00* (2019.01)

(58) Field of Classification Search
CPC ....................................................... G06F 9/44
See application file for complete search history.

(56) References Cited

U.S. PATENT DOCUMENTS

| 2013/0073883 | A1* | 3/2013 | Vick | G06F 1/32 713/320 |
| 2017/0091461 | A1* | 3/2017 | Tin | G06F 21/53 |
| 2019/0215329 | A1* | 7/2019 | Levy | G06N 20/00 |

* cited by examiner

*Primary Examiner* — Jae U Jeon
(74) *Attorney, Agent, or Firm* — Nicholson De Vos Webster & Elliott, LLP

(57) ABSTRACT

Techniques for analyzing code are described. In some instances, a code analysis service is to perform a series of comparisons, one or more per path segment of an index structure of non-defective code samples, using a token derived from a defective code segment of the stored code, to determine one or more paths in the index, wherein each path is to point to code that is similar to the defective code segment; and provide, in response to the series of comparisons, at least one of: a location of the code determined to be similar to the defective code segment and the code determined to be similar.

20 Claims, 9 Drawing Sheets

```
PUBLIC STATIC BOOLEAN ISTIMEDIFFERENCEVALID(STRING DATESTART,INT TIMEOUT){
 SIMPLEDATEFORMAT DATEFORMAT = NEW SIMPLEDATEFORMAT("YY/MM/DD HH:MM:SS");
 DATE DATE = NEW DATE();
 STRING DATESTOP = DATEFORMAT.FORMAT(DATE);
 DATE D1 = NULL;
 DATE D2 = NULL;
 TRY {
   D1 = DATEFORMAT.PARSE(DATESTART);
   D2 = DATEFORMAT.PARSE(DATESTOP);
 } CATCH (...) {
   ...
 }
 ...
}
```

HIGHLIGHTED "DEFECTIVE" CODE 503

CODE SNIPPET 501

FIG. 5

```
PUBLIC STATIC DATE STRINGTODATE(STRING DATESTR, STRING FORMATSTR) {
   DATE DATE = NULL;
   SIMPLEDATEFORMAT FORMAT = NEW SIMPLEDATEFORMAT(FORMATSTR);
   IF (DATESTR != NULL && !DATESTR.EQUALS("")) {
      STRING TIME = "";
      TRY {
         DATE DATETWO = FORMAT.PARSE(DATESTR);
         TIME = FORMAT.FORMAT(DATETWO);
         DATE = FORMAT.PARSE(TIME);
      } CATCH (PARSEEXCEPTION E) {
         E.PRINTSTACKTRACE();
      }
   } ELSE {
      STRING TIMETWO = FORMAT.FORMAT(NEW DATE());
      TRY {
         DATE = FORMAT.PARSE(TIMETWO);
      } CATCH (PARSEEXCEPTION E) {
         E.PRINTSTACKTRACE();
      }
   }
   RETURN DATE;
}
```

HIGHLIGHTED "SIMILAR" CODE 603

CODE SNIPPET 601

FIG. 6

LEVERAGING TRAINING DATA TOWARDS INCREASING THE EXPLAINABILITY OF ML-BASED CODE ANALYSIS TOOLS

BACKGROUND

Subtle aspects of coding may be missed or misunderstood by developers. Examples include closing resources along all control paths; declassifying sensitive data before logging it; synchronization bugs; and insufficient input validation in the face of injection and denial of service attacks.

BRIEF DESCRIPTION OF DRAWINGS

Various embodiments in accordance with the present disclosure will be described with reference to the drawings, in which:

FIG. 5 illustrates an example of a snippet of code that has been detected to have a defect.

FIG. 6 illustrates an example of a snippet of code that is pointed to by the path detailed with respect to FIG. 5.

DETAILED DESCRIPTION

The present disclosure relates to methods, apparatus, systems, and non-transitory computer-readable storage media for determining code that is similar to code that has been detected to have some defect.

As noted earlier, automated tools may be used to detect aspects of coding that are easily missed or misunderstood by developers and that constitute defects. Illustrating a problem in code, and how one may address it, is not always a straightforward task. An approach is to highlight "defective" code (code that has an issue such as those detailed above) and provide one or more examples of code that is similar to the "defective" code, but that lacks the defect. Note there may be several automated tools (called detectors in this description) that operate in different manners but are used to find the same types of defects.

Detailed herein is an infrastructure to organize—index and retrieve—relevant samples from mining should be reusable across detectors, and at the same time, configurable (or customizable) so as to address the particular needs of different detectors with maximal accuracy.

As such, embodiments which use a hierarchical index to find relevant samples of code are described. In some examples, this indexing is detector agnostic. In particular, in some embodiments, non-defective code samples are mined and then organized into an index (e.g., a tree structure) which is consulted during inference to find the most suitable example(s). In some instances, a given non-defective sample is indexed via an array, or vector, of named attributes from the non-defective code along with a field that points to the code location(s) where the sample was derived. In other instances, a given non-defective sample is indexed via an array, or vector, of named attributes from the non-defective code along with the non-defective sample. Further, in some embodiments, non-defective code is found by running the same detectors that are used to find defective code.

In some embodiments, a training stage comprises building the index by, for example, scanning through the code repositories and generating paths of ordered lists of tokens to each sample. In some embodiments, an inference stage comprises getting metadata tokens for the problematic code, generating a query for the index using the metadata tokens, querying the index using the query based on computing similarities (such as distances) between corresponding tokens (e.g., from samples and from the problematic code token), and providing a result of the query.

In some embodiments, the training stage is performed using labeled data. Code is mined to generate labels and those labels that are positive (indicative of a good practice) are used to generate the index.

Figure 1:
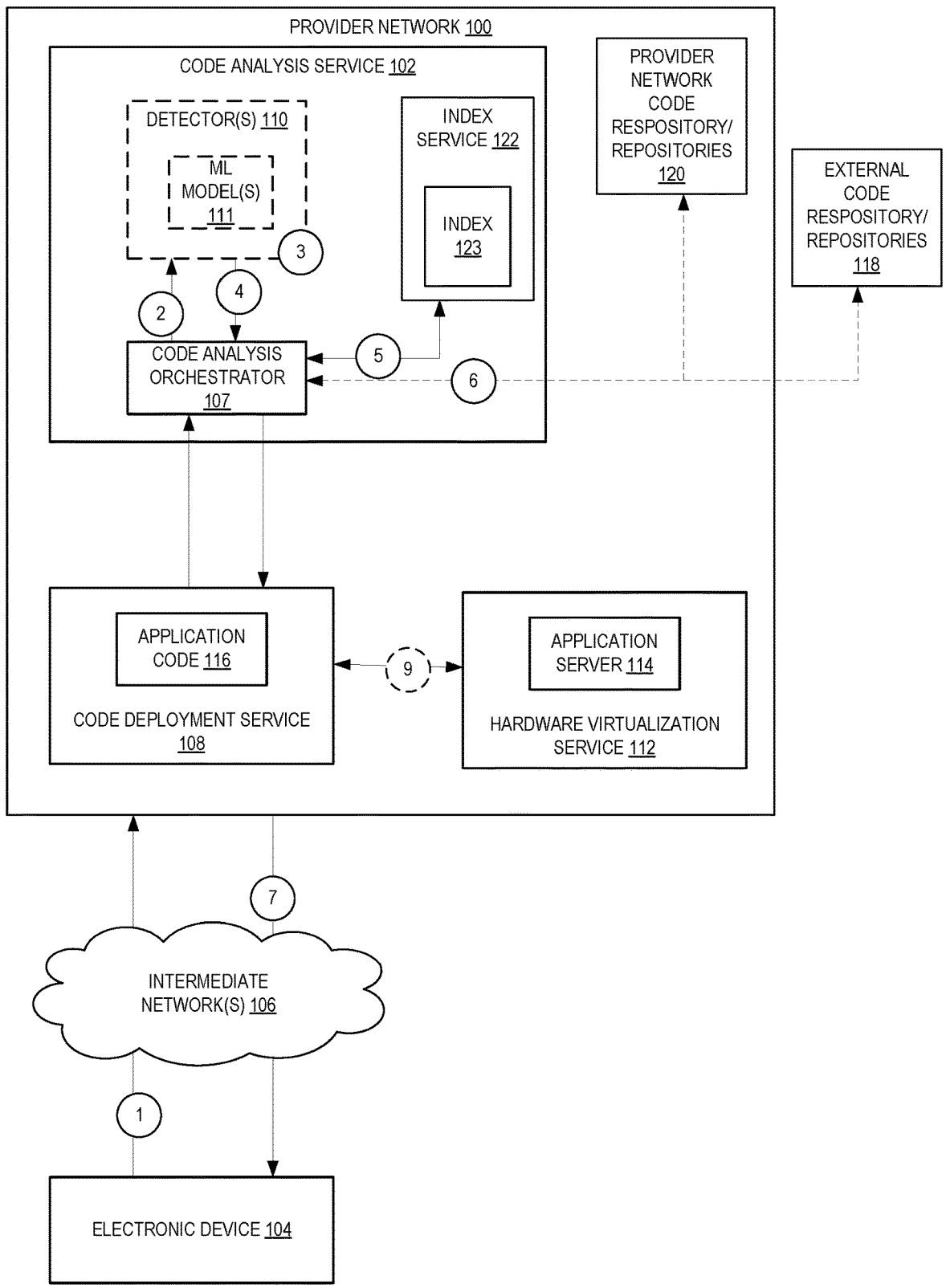
FIG. 1 illustrates embodiments of systems that include a code analysis service of a provider network.

FIG. 1 illustrates embodiments of systems that include a code analysis service of a provider network. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HITP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, the provider network 100 includes a code analysis service 102 which may be used to find defects in code and/or find non-defective code that is similar in nature to previously found defective code. In particular, in some embodiments, detector(s) 110 are used to analyze code to look for defects. Examples of detectors include but are not limited to: information leakage detectors, resource leak detectors, best practice violation detectors, concurrency issue detectors, input validation detectors, and general coding issue detectors. In some embodiments, a detector 110 utilizes one or more machine learning model(s) 111 to look for defective code.

The code analysis service 102 includes an index service 122 which maps non-defective samples within an index such as index 123. An index is instantiated by supplying to the index service 122 at least two configuration parameters relative to what is can be detected by a given detector: 1) an index structure which is the depth of the index (e.g., tree) and a mapping function from mined, non-defective samples to paths along the tree: and 2) similarity comparison functions (such as distance functions) that are to be used during inference (using a detected defective code to find similar, non-defective code using the index) to find at least one closest minded path for a non-defective sample in the index. Note that in some embodiments, each node in the tree has a "context" field that records the prefix up to that node which may help ensure context-sensitive path usage. Examples of distance functions to use include, but are not limited to: edit distance (e.g., Levenshtein distance), equality distance (equals 0 when the strings are same and infinity otherwise), overlap distance (given a delimiter that splits the strings (e.g., "," and none of the resulting tokens overlap this is 0 or infinity otherwise), and overlap-count distance (the more the strings overlap (after splitting), the closer they are to each other).

The index service 122 mines for samples to build the index 123 using one or more code repositories such as provider network code repository/repositories 120 and external code repository/repositories 118. The index(es) 123 may be built by applying using the detector(s) 110 on the one or more repositories in some embodiments. In other embodiments, the training stage is performed using labeled data. Code is mined to generate labels and those labels that are positive (indicative of a good practice) are used to generate the index. Outputs of detector(s) 110 (either in index building or inference) include an identification of code that may have an issue.

During inference, the index service 122 traverses the index(es) 123 to find similar, non-defective code based on an output of a detector. In some embodiments, the index service 122 generates an ordered search query of metadata tokens to traverse the index(es) 123 based upon the output of a detector. In some embodiments, index service 122 utilizes a provided method (e.g., supplied by the detector creator/owner) to extract metadata tokens from the analyzed code to generate the ordered search query Note that the index service 122 is detector agnostic, any detector may be used (including ones not included in the code analysis service 102) to find issues in code so long as the index service 122 knows how to extract relevant metadata tokens from the code corresponding to a found issue.

In some embodiments, the code analysis orchestrator 107 receives configuration parameters to configure usage of the detector(s) 110, index service 122, etc. Examples of configuration parameters include, but are not limited to: the configuration parameters detailed above, storage locations of the one or more repositories, identification of detector(s) to use, storage location(s) of results, an identifier of an index to use, etc. Additionally, in some embodiments, a "width" of different layers in the tree representation may be supplied as a configuration parameter.

The code analysis orchestrator 107 is also responsible, in some embodiments, for performing one or more of calling a detector to analyze a code segment (such as application code 116), receiving an output of the detector (or receiving an output generated by a detector at an earlier time), calling the index service 122 to generate a search query for the index 123 based on received output from a detector (this may include extracting metadata tokens as noted above), receiving the output from the index service 122 query, and providing the output of the index service 122 to a requestor. In some instances, the code analysis orchestrator 107 pulls the code that the output of the index service 122 points to. Note that in some embodiments, some of the above acts are not needed (e.g., calling a detector). In some embodiments, the code analysis orchestrator 107 extracts metadata tokens from the analyzed code segment (e.g., using a provided method) and generates the search query for the index service 122 to use. Note, in some embodiments, the detector(s) 110 more directly communicates with the index service 122 as a part of its programing.

As shown, in some embodiments, the provider network 100 includes a code deployment service 108 used to deploy application code 116 (the code that is analyzed) in a hardware virtualization service 12 using one or more application servers 114.

Circles with numbers inside indicate an example of a flow for inference using the code analysis service 102. At circle 1, electronic device 104 sends a request to the provider network 100 to analyze application code 116. The code analysis service 102 receives this request and calls the code analysis orchestrator 107 to process the request.

At circle 2, the code analysis orchestrator 107 calls a detector of detectors 110 (as dictated by the request) to analyze the application code 116. The called detector analyzes the application code at circle 3 and provides a result back to the code analysis orchestrator 107 at circle 4.

The code analysis orchestrator 107 takes that result and calls the index service 122 at circle 5. In some embodiments, the code analysis orchestrator 107 generates the search query for the index service 122 including the organization of metadata tokens from the application code 116 (either provided or extracted). In other embodiments, the index service 122 generates the search query which may include using a method to extract metadata tokens from the application code 116.

At circle 6, the code analysis orchestrator 107 pulls the similar, non-defective code indicated by the index service's 122 query of one or more indexes 123 and provides that code back to the electronic device 104 at circle 7. Note that in some instances, the code analysis orchestrator 107 will merely provide a pointer to the similar, non-defective code and not the code itself. The result back to the electronic device 104 may also include a highlighting of the similar, non-defective code and/or an explanation as to why it is better.

Figure 2:
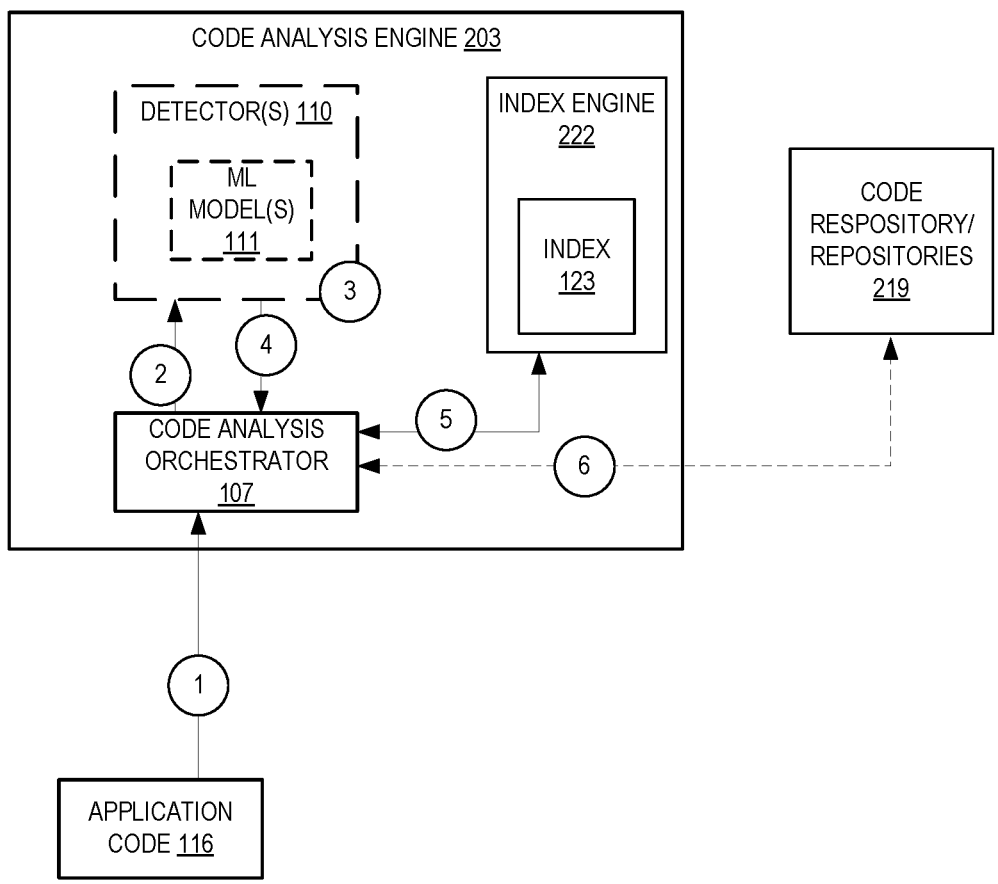
FIG. 2 is a diagram illustrating an environment for providing an indication of similar, non-defective code according to some embodiments.

FIG. 2 is a diagram illustrating an environment for providing an indication of similar, non-defective code according to some embodiments. In this environment, a code analysis engine 203 is utilized. This code analysis engine 203 is not provided by a provider network such as that detailed in FIG. 1. Where the reference numbers are the same as in FIG. 1 the same or similar functionality as detailed above. Note that like FIG. 1's code analysis service 102, the code analysis engine 203 may not include detector(s) 110.

The code analysis engine 203 includes an index engine 222 which maps non-defective samples within an index such as index 123. An index is instantiated by supplying to the index engine 222 at least two configuration parameters relative to what is can be detected by a given detector: 1) an index structure which is the depth of the index (e.g., tree) and a mapping function from mined, non-defective samples to paths along the tree; and 2) similarity comparison functions (such as distance functions) that are to be used during inference (using a detected defective code to find similar, non-defective code using the index) to find at least one closest minded path for a non-defective sample in the index. Note that in some embodiments, each node in the tree has a "context" field that records the prefix up to that node which may help ensure context-sensitive path usage. Examples of distance functions to use include, but are not limited to: edit distance (e.g., Levenshtein distance), equality distance (equals 0 when the strings are same and infinity otherwise), overlap distance (given a delimiter that splits the strings (EG ",") and none of the resulting tokens overlap this is 0 or infinity otherwise), and overlap-count distance (the more the strings overlap (after splitting), the closer they are to each other).

The index engine 222 mines for samples to build the index 123 using one or more code repositories such as code repository/repositories 219. The index(es) 123 may be built by applying using the detector(s) 110 on the one or more repositories in some embodiments. In other embodiments, the training stage is performed using labeled data. Code is mined to generate labels and those labels that are positive (indicative of a good practice) are used to generate the index. Outputs of detector(s) 110 (either in index building or inference) include an identification of code that may have an issue.

During inference, the index engine 222 traverses the index(es) 123 to find similar, non-defective code based on an output of a detector In some embodiments, the index engine 222 generates an ordered search query of metadata tokens to traverse the index(es) 123 based upon the output of a detector. In some embodiments, index engine 222 utilizes a provided method (e.g., supplied by the detector creator/owner) to extract metadata tokens from the analyzed code to generate the ordered search query. Note that the index service 122 is detector agnostic, any detector may be used (including ones not included in the code analysis service 102) to find issues in code so long as the index engine 222 knows how to extract relevant metadata tokens from the code corresponding to a found issue.

In some embodiments, the code analysis orchestrator 107 receives configuration parameters to configure usage of the detector(s) 110, index engine 222, etc. Examples of configuration parameters include, but are not limited to: the configuration parameters detailed above, storage locations of the one or more repositories, identification of detector(s) to use, storage location(s) of results, an identifier of an index to use, etc. Additionally, in some embodiments, a "width" of different layers in the tree representation may be supplied as a configuration parameter.

The code analysis orchestrator 107 is also responsible, in some embodiments, for performing one or more of: calling a detector to analyze a code segment (such as application code 116), receiving an output of the detector (or receiving an output generated by a detector at an earlier time), calling the index engine 222 to generate a search query for the index 123 based on received output from a detector (this may include extracting metadata tokens as noted above), receiving the output from the index engine 222 query, and providing the output of the index service 122 to a requestor. In some instances, the code analysis orchestrator 107 pulls the code that the output of the index engine 222 points to. Note that in some embodiments, some of the above acts are not needed (e.g., calling a detector). In some embodiments, the code analysis orchestrator 107 extracts metadata tokens from the analyzed code segment (e.g., using a provided method) and generates the search query for the index engine 222 to use. Note, in some embodiments, the detector(s) 110 more directly communicates with the index engine 222 as a part of its programming.

Circles with numbers inside indicate an example of a flow for inference using the code analysis engine 203. At circle 1, application code 116 is provided to the code analysis engine 203. The code analysis orchestrator 107 receives this request and, at circle 2, calls a detector of detectors 110 (as dictated by the request) to analyze the application code 116. The called detector analyzes the application code at circle 3 and provides a result back to the code analysis orchestrator 107 at circle 4.

The code analysis orchestrator 107 takes that result and calls the index engine 222 at circle 5. In some embodiments, the code analysis orchestrator 107 generates the search query for the index engine 222 including the organization of metadata tokens from the application code 116 (either provided or extracted). In other embodiments, the index engine 222 generates the search query which may include using a method to extract metadata tokens from the application code 116.

At circle 6, the code analysis orchestrator 107 pulls the similar, non-defective code indicated by the index engine's 222 query of one or more indexes 123 and provides that code to a request. Note that in some instances, the code analysis orchestrator 107 will merely provide a pointer to the similar, non-defective code and not the code itself. The result back to the ay also include a highlighting of the similar, non-defective code and/or an explanation as to why it is better.

Figure 3:
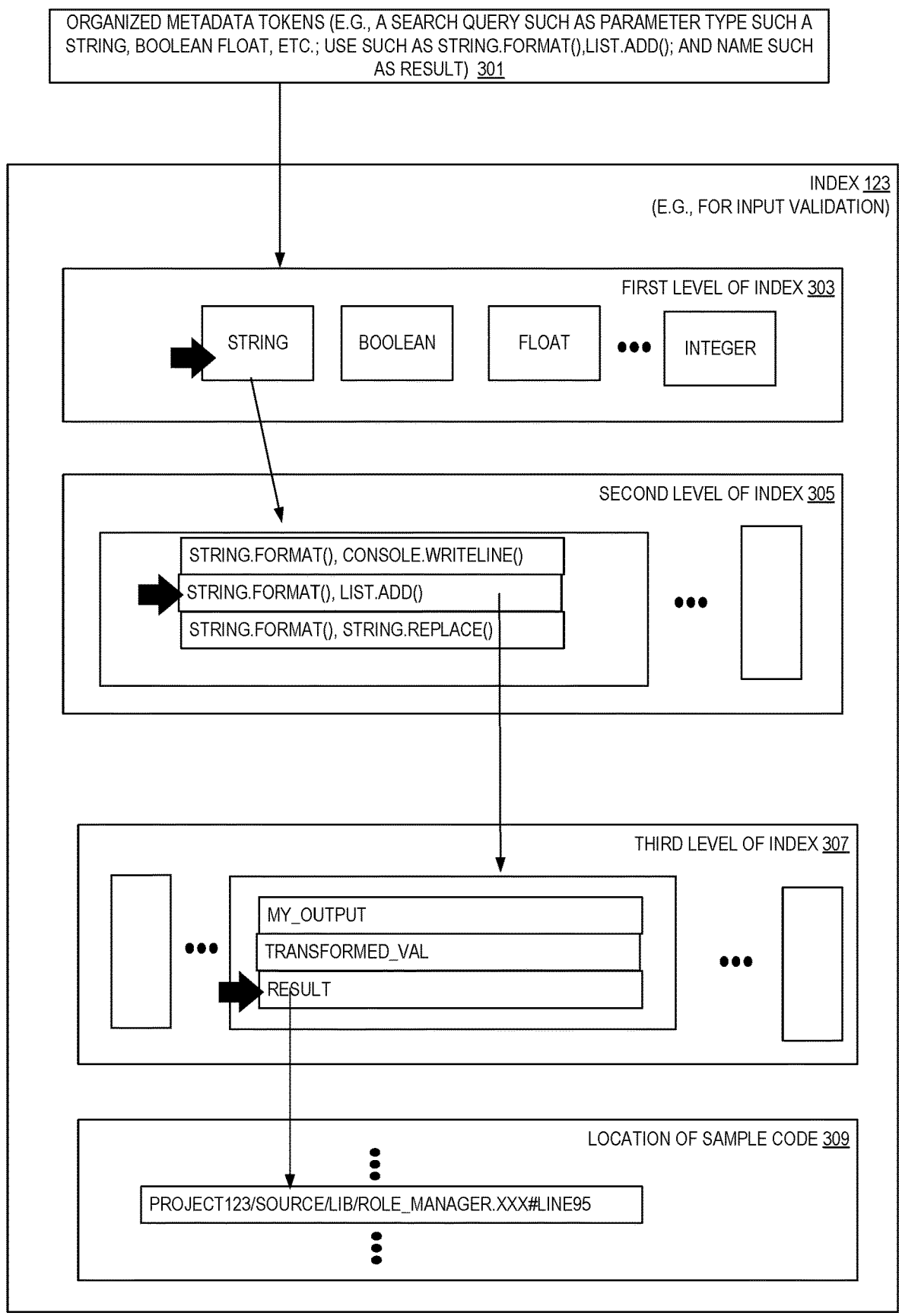
FIG. 3 illustrates an example of using organized metadata tokens to generate a search query in an index according to some embodiments.

FIG. 3 illustrates an example of using organized metadata tokens to generate a search query in an index according to some embodiments. As shown, organized metadata tokens 301 are used to form a search query. In this example, the query uses tokens generated from an input validation detection. As shown, the index 123 comprises a plurality of levels for parameter type, use, and name. Traversing from one level to another is a path segments of the index.

The first level 303 of the index 123 uses a distance calculation to find a match between the parameter type (here string) and entries in this level 303. For example, an equality distance calculation may be used to find a match. Note that matches do not need to be identical (hence the use of a distance calculation).

The second level 305 of the index 123 uses a distance calculation to find a match between the use and entries in this level 305. For example, an overlap count distance calculation may be used to find a match. Note that matches do not need to be identical (hence the use of a distance calculation).

The third level 307 of the index 123 uses a distance calculation to find a match between the parameter name and entries in this level 307. For example, an edit distance calculation may be used to find a match. Note that matches do not need to be identical (hence the use of a distance calculation).

Finally, a location of the sample code 309 is provided in the index 123.

In some embodiments, an index for information leakage is a 4-level hierarchy having levels for the scenario, variable type (string, securetext, etc.), uses, and variable name (in that order). This index may use distance calculations for the first level (scenario) of overlap, overlap for the second level (variable type), overlap count for the third level (use(s)), and edit for the fourth level (variable name).

Figure 4:
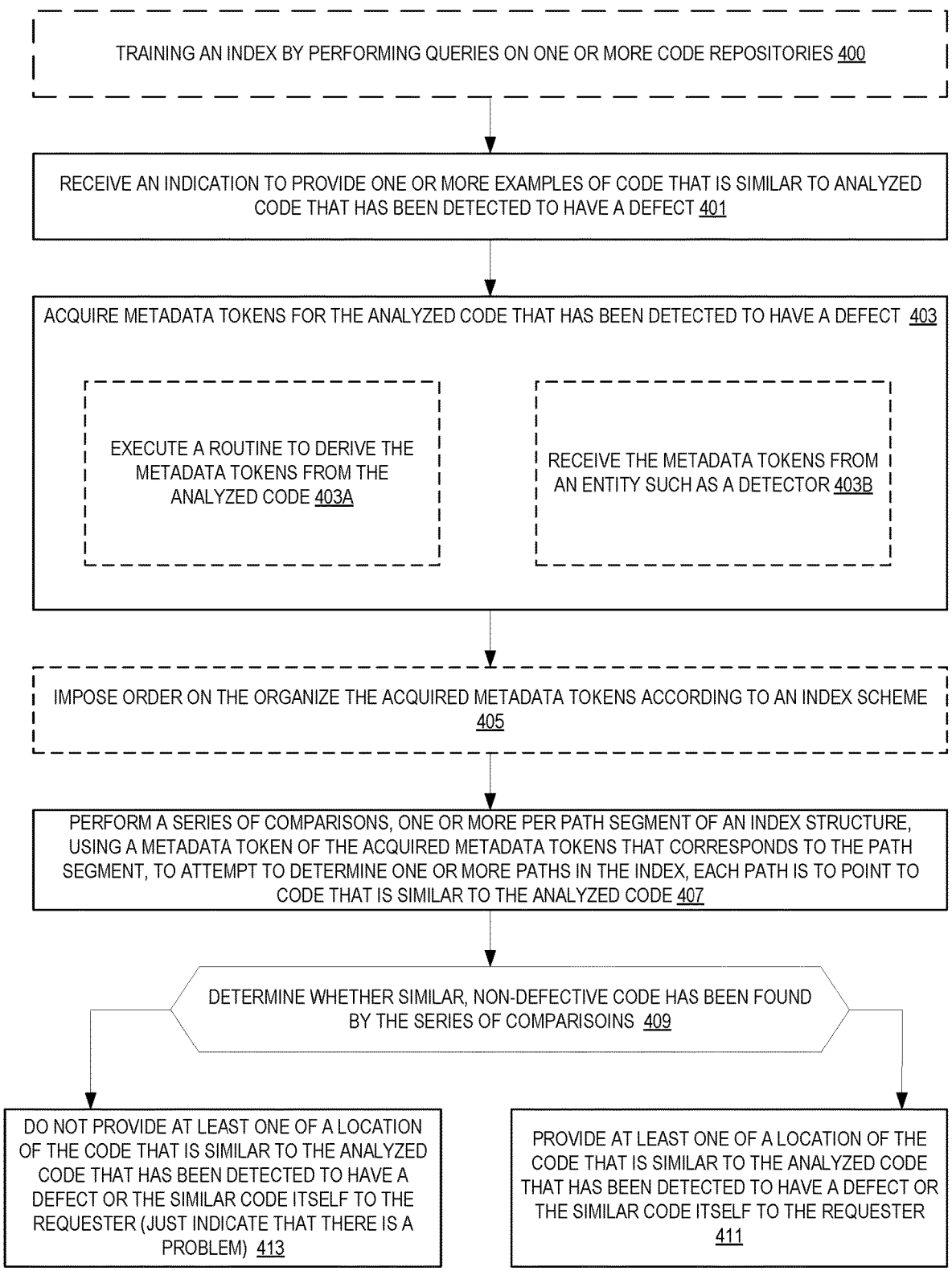
FIG. 4 is a flow diagram illustrating operations of a method for performing ascertaining code using an index according to some embodiments.

FIG. 4 is a flow diagram illustrating operations of a method for performing ascertaining code using an index according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the code analysis service 102 or code analysis engine 203 of the other figures.

In some embodiments, an index is trained by performing queries on one or more code repositories at 400. An index may be trained by querying one or more code repositories for code samples based on an ordered list of samples to find similar code and then confirming the found code is not defective (e.g., using a detector). A path for the similar, non-defective code is then made in the index including either a link to the sample code or the sample code itself. Note, in some embodiments, one or more of the code repositories are not subject to a license such that sharing the code does not present a licensing issue.

At some point later in time, an indication to provide one or more examples of code that is/are similar, but not defective, to analyzed code that has been detected to have a defect is received at 401. This indication may be from a detector (in response to finding defective code), a user in response to having a detector find defective code, or be generated by a code analysis orchestrator in response to the output of a detector. This indication may be received by a code analysis orchestrator, an index service, and/or an index engine such as those detailed above. Note a detector may provide a pointer to the defective segment, the defective segment itself, etc. and, in some instances, the type of defect.

In response to the indication that one or more similar, non-defective code segments are to be found (if possible), metadata tokens for the analyzed code segment that has been detected to have a defect are acquired at 403. In some embodiments, this acquisition comprises executing a provided routine to derive metadata tokens from the defective code segment at 403A. This routine may be executed by one or more of a detector, a code analysis orchestrator, an index service, and/or an index engine. In other embodiments, this acquisition comprises receiving metadata tokens from the detector or other entity at 403B.

An order is imposed on the acquired metadata tokens, if needed, at 405. For example, in some embodiments an ordered list is generated what is used to make a query to the index and should be in the order that is used by the index.

At 407, a series of comparisons, one or more per path segment of an index structure, using a metadata token of the acquired metadata tokens that corresponds to the path segment, are performed to determine one or more paths in the index. Note that each path is to point to code that is similar, but not defective, to the analyzed code. Examples of the types of comparisons have been discussed with respect to at least FIG. 3.

A determination of if there is at least one similar, non-defective sample from the query is made at 409. If there is not a similar, non-defective sample, then at 413 there is no providing of a sample. In some instances, an indication that there is a problem with the analyzed code is provided instead.

When there is at least one similar, non-defective sample, at least one similar, non-defective sample is provided at 411. This provision may come in the form of a pointer (e.g., link) to the sample code or the sample code itself. In some instances, the portion of the sample code to look at is highlighted. Additionally, in some instances, an explanation of why the sample portion is not defective is provided.

FIG. 5 illustrates an example of a snippet of code that has been detected to have a defect. The code snippet 501 includes a "defective" line that processes user input through the following parameter of 'dateStart' (index: 0) which is highlighted at 503. Malicious, malformed, or unbounded inputs can cause security breaches, crashes, and performance slowdown.

In some embodiments, the defective code was found using a ML input validation model. Input validation ensures only properly formed data is used and thus preventing malformed data from persisting and triggering a malfunction of various downstream components.

In this example, metadata tokens that may be acquired for the "defective" code include tokens that are typical of an input validation of a parameter type token (here that is a string), a token comprising a list of parameter usage (here SimpleDateFormat.parse( )), and a parameter name (here dateStart). This indicates a hierarchy in the index 123 of three. Tokens that are typical of an input validation of a leakage scenario (how the sample was detected such as training or how the leak should be fixed), a variable type (e.g., string, securetext, etc.), a token comprising a list of variable usage, and a variable name. This indicates a hierarchy in the index 123 of four. As noted above, these tokens may be provided by the ML model performing the determination of a defect, extracted from the code segment determined to have the defect using a provided method, etc.

In some embodiments, the acquired tokens are then ordered such that they follow path in the index 123. For example, in this illustration, the order is parameter type, use, and parameter name. And the path in the index is:

Context: [ ], type: String→
    Context: [type: String]→users: [SimpleDateFormat.parse( ), !=, String.equals( )]→Context: [type: String, use: [SimpleDateFormat.parse( ), !=, String.equals( )]]name: dateStr]

which points to similar code without a defect (at the end of the path there is a URL or code segment without a defect).

Note that this path includes three path segments (as shown) and at each path segment an analysis is performed using one or more similarity (such as distance) calculations such as those detailed above.

FIG. 6 illustrates an example of a snippet of code that is pointed to by the path detailed with respect to FIG. 5. In this code snippet 601, when the date string is checked to determine if it is properly formed.

Figure 7:
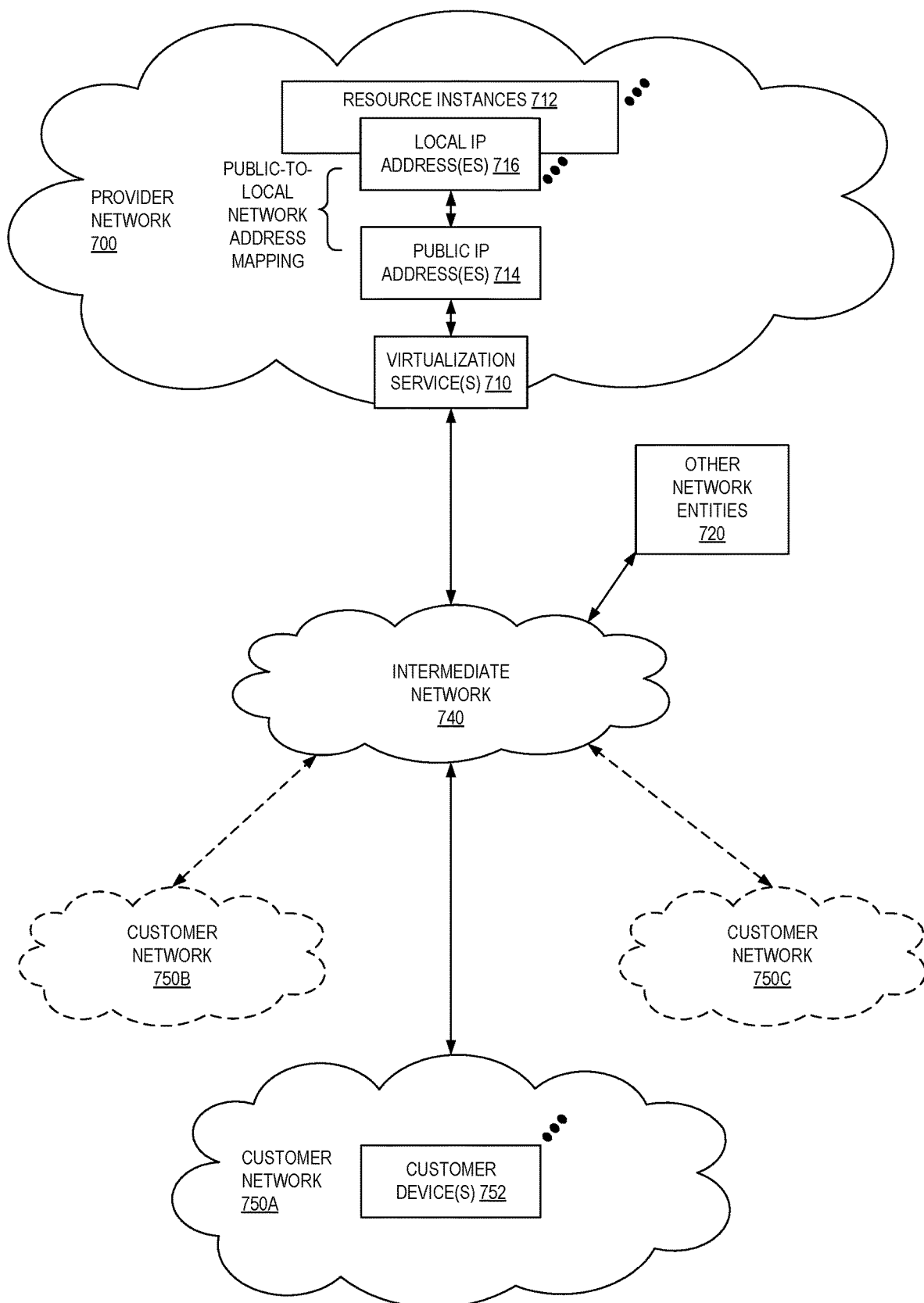
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
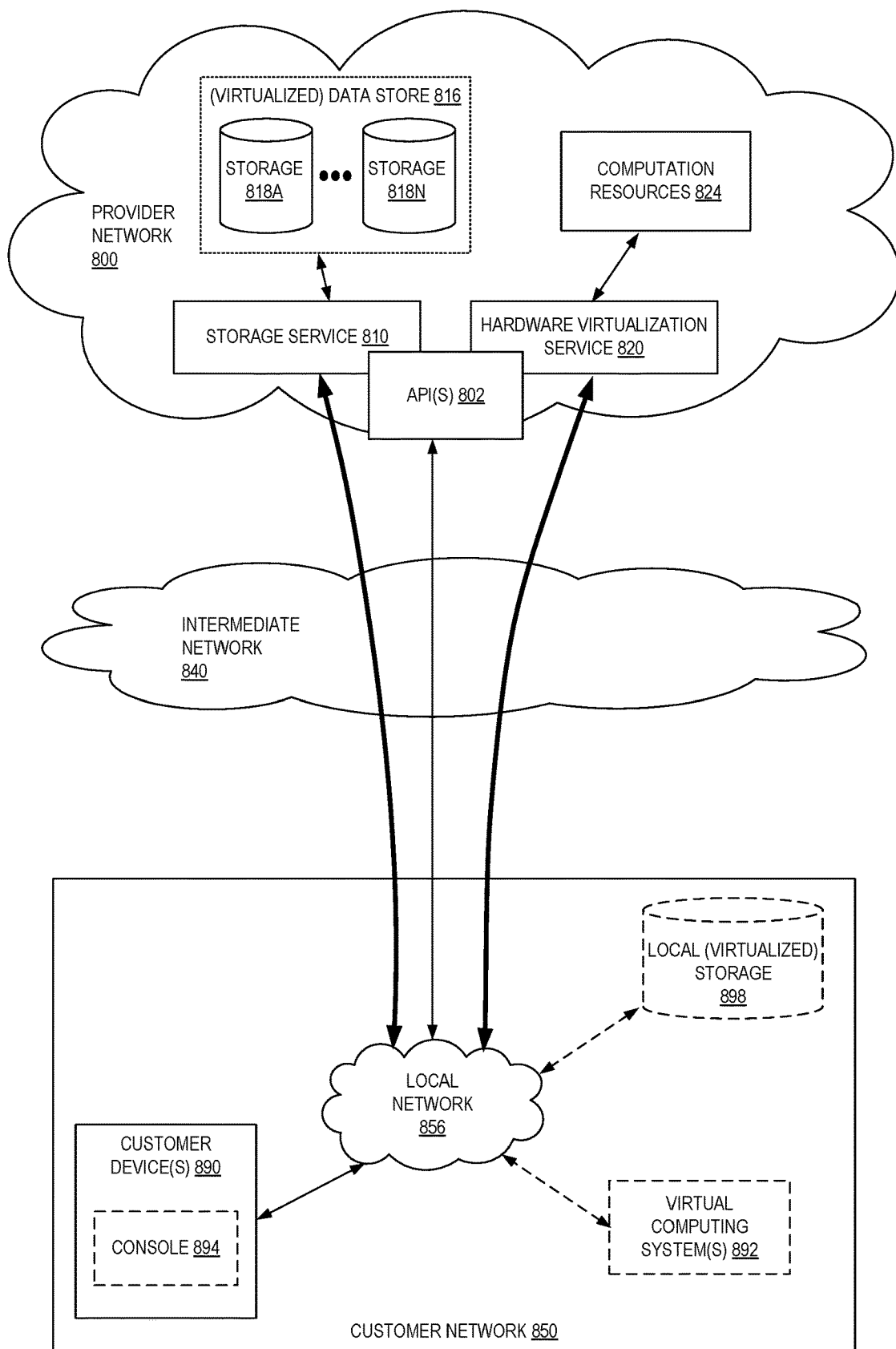
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
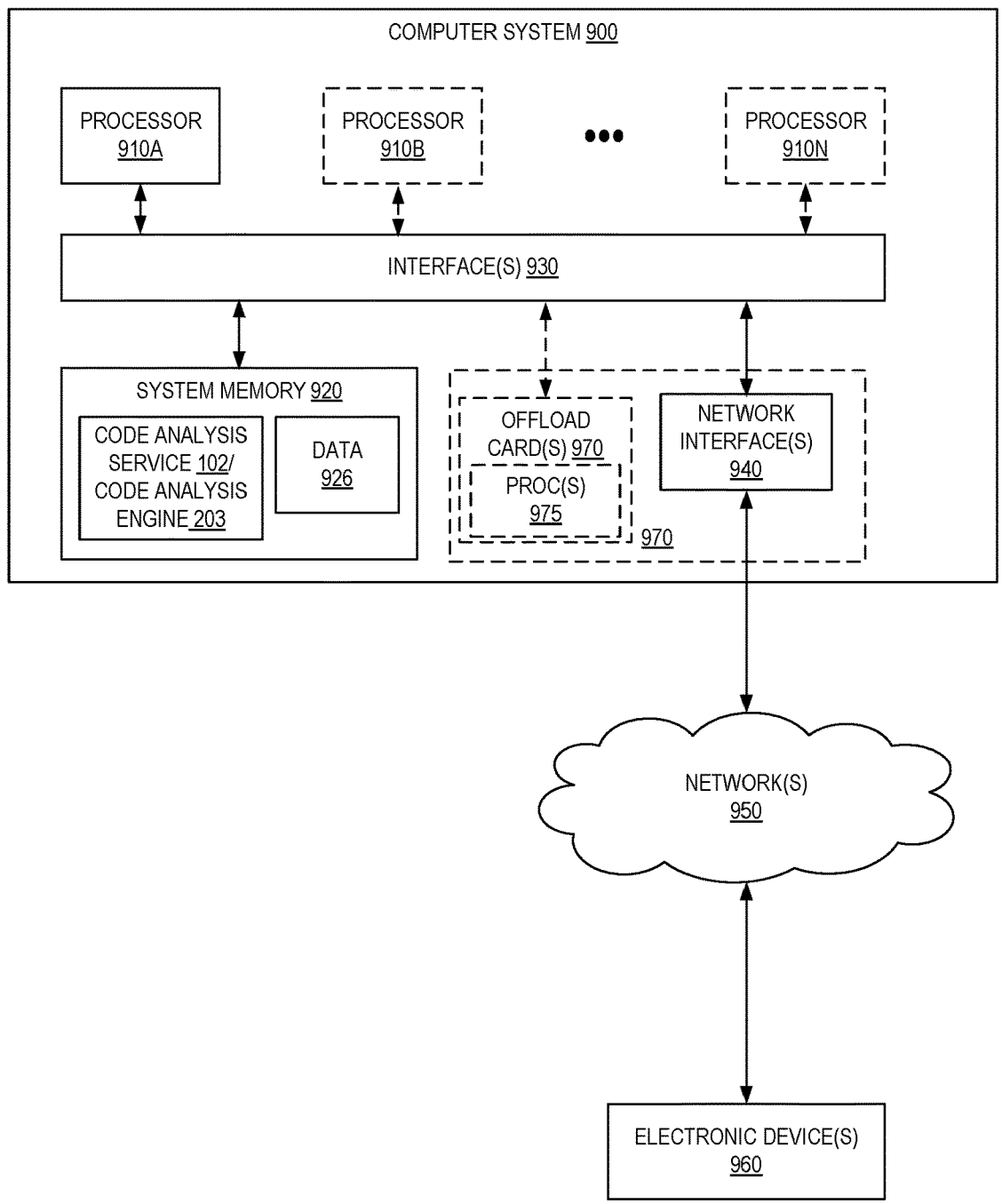
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code analysis service 102 (or code analysis engine 203) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving an indication to provide at least one example of code that is similar to code that has been determined by a machine learning model to have a defect;
   executing a routine to derive metadata tokens for the analyzed code;
   imposing an order on the derived metadata tokens;
   performing a series of comparisons, one or more per path segment of an index structure, using a metadata token of the acquired metadata tokens that corresponds to the path segment, to determine one or more paths in the index, each path to point to code that is similar to the analyzed code; and
   providing, to the requester, at least one of:
   a location of the code determined to be similar to the analyzed code that has been detected to have a defect, and
   the code determined to be similar.

2. The computer-implemented method of claim 1, wherein the defect is one of an input validation defect, a resource leak, a violation of best practice rules, an issue with concurrency, an information leakage defect, and a general coding issue.

3. The computer-implemented method of claim 1, wherein the series of comparisons comprises using one or more distance calculations.

4. A computer-implemented method comprising:
   performing a series of comparisons, one or more per path segment of an index structure of non-defective code samples, using a token derived from a defective code segment, to determine one or more paths in the index, wherein each path is to point to code that is similar to the defective code segment; and
   providing, in response to the series of comparisons, at least one of:
   a location of the code determined to be similar to the defective code segment, and the code determined to be similar.

5. The computer-implemented method of claim 4, wherein the defect is one of an input validation defect, a resource leak, a violation of best practice rules, an issue with concurrency, an information leakage defect, and a general coding issue.

6. The computer-implemented method of claim 4, wherein the series of comparisons comprises using one or more similarity-based calculations.

7. The computer-implemented method of claim 4, wherein each token is derived from the defective code segment using a provided routine corresponding to a defect detector.

8. The computer-implemented method of claim 4, wherein each token is derived from the defective code segment by a defect detector.

9. The computer-implemented method of claim 4, wherein the defective code has been found using a machine learning model.

10. The computer-implemented method of claim 4, further comprising:
training the index by using labeled data examples.

11. The computer-implemented method of claim 4, further comprising:
training the index by performing token-based queries on one or more code repositories.

12. The computer-implemented method of claim 10, wherein the one or more code repositories are not subject to an open source license.

13. The computer-implemented method of claim 4, wherein the code determined to be similar is highlighted.

14. The computer-implemented method of claim 4, wherein the tokens to be derived from a defective code are definable based upon a type of defect found.

15. A system comprising:
storage to store code; and
a code analysis service implemented by a second one or more electronic devices, the code analysis service including instructions that upon execution cause the code analysis service to:
perform a series of comparisons, one or more per path segment of an index structure of non-defective code samples, using a token derived from a defective code segment of the stored code, to determine one or more paths in the index, wherein each path is to point to code that is similar to the defective code segment; and
provide, in response to the series of comparisons, at least one of:
a location of the code determined to be similar to the defective code segment, and
the code determined to be similar.

16. The system of claim 15, wherein the defect is one of an input validation defect, a resource leak, a violation of best practice rules, an issue with concurrency, an information leakage defect, and a general coding issue.

17. The system of claim 15, wherein the series of comparisons comprises using one or more similarity-based calculations.

18. The system of claim 15, wherein each token is derived from the defective code segment using a provided routine corresponding to a defect detector.

19. The system of claim 15, wherein each token is derived from the defective code segment by a defect detector.

20. The system of claim 15, wherein the defective code has been found using a machine learning model.

* * * * *